(12) United States Patent
Egoshi et al.

(10) Patent No.: US 8,210,810 B2
(45) Date of Patent: Jul. 3, 2012

(54) ROTOR TURNING DEVICE FOR WIND TURBINE GENERATOR AND ROTOR TURNING METHOD

(75) Inventors: Hideya Egoshi, Tokyo (JP); Kunikazu Watanabe, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 12/673,999

(22) PCT Filed: Feb. 3, 2010

(86) PCT No.: PCT/JP2010/051498
§ 371 (c)(1),
(2), (4) Date: Jul. 13, 2011

(87) PCT Pub. No.: WO2011/096053
PCT Pub. Date: Aug. 11, 2011

(65) Prior Publication Data
US 2011/0260461 A1    Oct. 27, 2011

(51) Int. Cl.
*F01D 7/00* (2006.01)
(52) U.S. Cl. ........................ 416/1; 416/170 R
(58) Field of Classification Search .............. 416/170 R, 416/244 R, 245 R, 245 A, 159, 154, 1; 415/122.1, 415/123, 124; 464/182, 49; 474/95, 96, 474/903; 290/44, 55
See application file for complete search history.

(56) References Cited

U.S. PATENT DOCUMENTS

| 5,813,829 | A | 9/1998 | Mazzotta | |
|---|---|---|---|---|
| 7,958,797 | B2* | 6/2011 | Aust et al. | ..... 74/99 R |
| 2006/0196288 | A1 | 9/2006 | Aust et al. | |
| 2009/0278359 | A1 | 11/2009 | Trede | |
| 2011/0142647 | A1* | 6/2011 | Husken et al. | ..... 416/159 |

FOREIGN PATENT DOCUMENTS

| DE | 10334448 A1 | 2/2005 |
|---|---|---|
| DE | 102008038128 A1 * | 2/2010 |
| EP | 1167754 A2 | 1/2002 |
| JP | 4-17552 U | 2/1992 |
| JP | 4-47168 U | 4/1992 |
| JP | 6-14608 U | 2/1994 |

OTHER PUBLICATIONS

Office Action issued in corresponding Australian application No. 2010200663 on Feb. 7, 2011.
International Search Report of Application No. PCT/JP2010/051498 mailed Apr. 20, 2010.

* cited by examiner

*Primary Examiner* — Edward Look
*Assistant Examiner* — Christopher R Legendre
(74) *Attorney, Agent, or Firm* — Kanesaka Berner & Partners, LLP

(57) ABSTRACT

A rotor turning device for a wind turbine generator which can be used without having to modify the existing wind turbine generator. A rotor turning device includes, on the inner periphery, a first member acting as a fixing member for fixing to a coupling hub, and on the outer periphery, a second member acting as an operating member to which operational force for rotating a rotation axis of the wind turbine generator. A pair of the first members embracingly fixes to the coupling hub of a coupling, while the second member attaches to the pair of first members to form a handle-like shape.

8 Claims, 10 Drawing Sheets

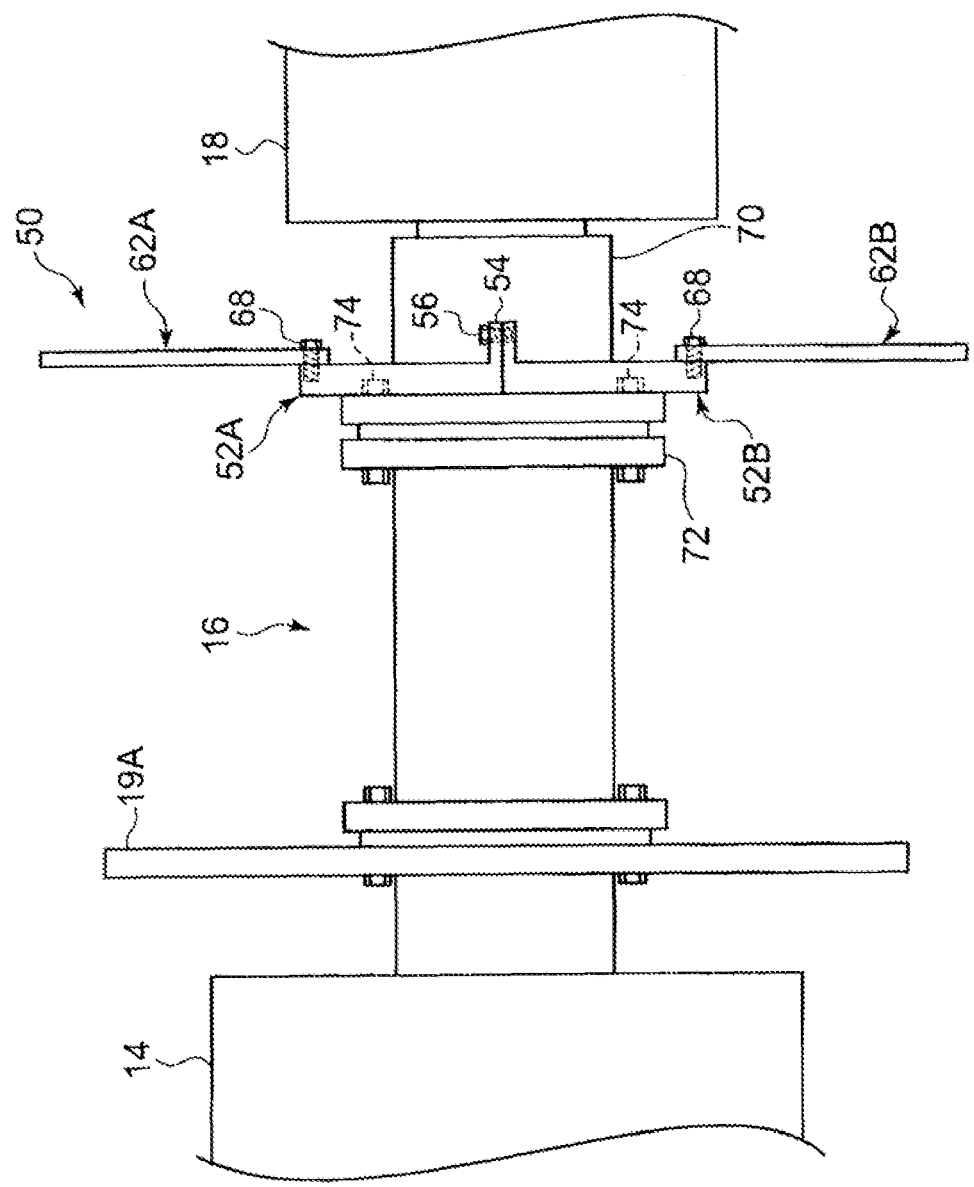

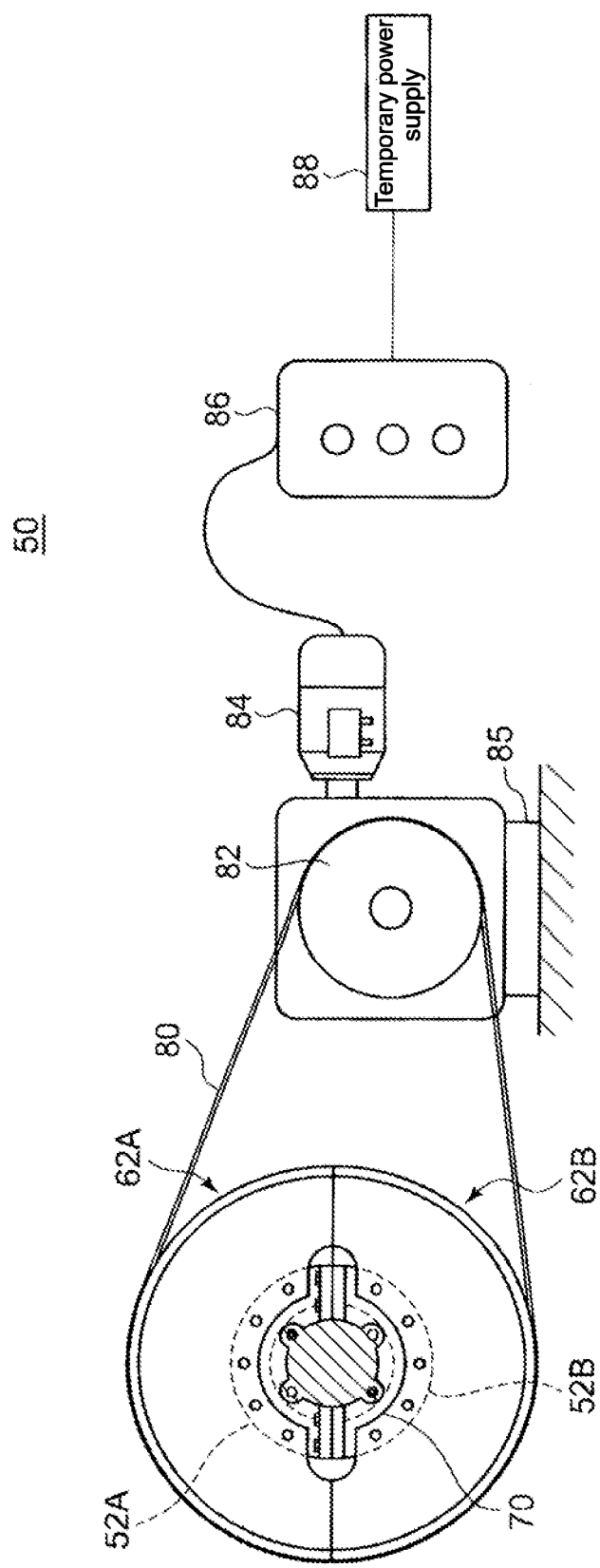

ROTOR TURNING DEVICE FOR WIND TURBINE GENERATOR AND ROTOR TURNING METHOD

RELATED APPLICATIONS

The present application is based on, and claims priority from, International Application Number PCT/JP2010/51498, filed Feb. 3, 2010, the disclosure of which is hereby incorporated by reference herein in its entirety.

BACKGROUND OF THE INVENTION

1. Field of the Invention

The present invention relates to a rotor turning device for a wind turbine generator and a rotor turning method. In particular, the invention relates to a rotor turning device for rotating a rotation axis of a wind turbine generator that increases rotational speed of a rotor head with a gear box to transmit into a generator, and to a method for turning the rotor.

2. Description of the Related Art

In recent years, from a view point of preserving the global environment, the use of wind turbine generators to generate reusable energy has become popular.

In general, a wind turbine generator comprises a rotor head equipped with blades, a nacelle accommodating a drive train and a generator, and a tower supporting the nacelle. The drive train is for transmitting a torque from the rotor head side to the generator side, and usually includes a gear box so that rotational speed of the rotor head is increased to transmit to the generator.

When performing maintenance work on the wind turbine generator, it often becomes necessary to rotate the rotation axis (or the rotor head connected to the rotation axis).

For example, to lubricate a main shaft bearing of the wind turbine generator, the rotation axis must be slowly rotated in order to evenly apply grease to the entire shaft bearing. Also, to assemble and disassemble the blades, the rotor head must be rotated so that the blades come into a horizontal position. In addition, for safety measures during maintenance work, the rotation axis should be secured with lock pins to prevent it from rotating. Again in this case, the rotation axis needs to be rotated to a position where the lock pins can be inserted.

Some convenient methods for rotating the rotation axis of the wind turbine generator for these purposes are to hand grasp and turn the brake disk attached to the rotation axis at the later stage of the gear box, or to turn the rotation axis by utilizing wind power applied to the blades.

However, with these methods, it was difficult to highly accurately rotate the rotation axis into a predetermined position. Further, a method with higher safety was desired.

Therefore, a so-called rotor turning device that forcibly rotates the rotation axis of the wind turbine generator has been proposed.

For example, US Patent Application Publication No. 2009/0278359 describes a rotor turning device that forcibly drives a speed-up gear housed in a gearbox (a gear box) from outside the gearbox. This rotor turning device comprises a drive pinion that meshes with the speed-up gear inside the gearbox and a screwdriver that is attached to the outside of the gearbox to transmit a torque to the drive pinion. With this structure, the torque from the screwdriver is transferred to the speed-up gear via the drive pinion making the rotation axis rotate with the speed-up gear.

Related Patent Documents

[Pre-Grant Publication Document 1] US2009/0278359

SUMMARY OF THE INVENTION

However, with the rotor turning device described in US Patent Application Publication No. 2009/0278359, the screwdriver must be attached to the gearbox, and further, the drive pinion must be arranged inside the gearbox. Thus it was necessary to make modifications to the existing wind turbine generator.

The present invention has been devised in view of the above situation and it is an object of the present invention to provide a rotor turning device for a wind turbine generator that does not require making modifications to existing wind turbine generators, and to provide a rotor turning method.

The present invention provides a rotor turning device for rotating a rotation axis of a wind turbine generator that increases rotational speed of a rotor head with a gear box to transmit into a generator, comprising: a main body; a fixing member provided on one end of the main body that fixes to a coupling arranged between the gear box and the generator of the wind turbine generator; and an operating member provided on the opposite end of the main body from the fixing member, to which operational force for rotating the rotation axis is inputted.

As mentioned above, the operating member is "provided on the opposite end of the main body from the fixing member". This means that the operating member is arranged on the opposite side, across a center part of the main body, from the fixing member. In other words, the fixing member is arranged on the main body at a side near the coupling while the operating member is arranged at a side far from the coupling. For example, with a disk-shaped rotor turning device, the fixing member is provided on the inner peripheral side of the disk (the main body) while the operating member is provided on the outer peripheral side of the disk (the main body). Further, with a lever-like shaped rotor turning device, the fixing member is provided on one end side of the lever (the main body) while the operating member is provided at the other end side of the lever (the main body).

According to this rotor turning device, the fixing member is fixed to the coupling arranged between the gear box and the generator while the operating member is provided at the opposite end of the main body from the fixing member. This makes it possible to safely and highly accurately rotate the coupling and the entire rotation axis with a relatively small operational force. Especially, since the coupling arranged between the gear box and the generator is an element in the drive train of the wind turbine generator that rotates with a low torque (in other words, is an element with high rotational speed), it is possible to rotate the rotation axis with a small operational force.

Further, since the above rotor turning device is configured so that it is attachable via the fixing member to the coupling that is normally included in the wind turbine generator, it is not necessary to make any modifications to an existing wind turbine generator.

In this specification, the term 'rotation axis' of the wind turbine generator refers to any axial elements included in the drive train that transmit the rotational speed of the rotor head to the generator.

In the above rotor turning device for the wind turbine generator, the main body preferably includes a pair of semi-circular ring shaped first members that embracingly fixes to a coupling hub of the coupling and a pair of semi-circular ring shaped second members that attaches to the periphery of the pair of first members, wherein the fixing member is the pair of first members embracingly fixed to the coupling hub, and the operating member is a handle formed by the pair of second members.

In this specification, to 'embracingly fix' the pair of first members to the coupling hub means that the pair of first members squeezes (or grabs) the coupling hub and fixes (or holds) it with frictional force.

In this manner, by embracingly fixing the pair of first members acting as the fixing member to the coupling hub of the wind turbine generator, the rotor turning device can be easily attached to the coupling without having to modify the existing wind turbine generator. Further, the first members and the second members are designed so that a total of four divided parts, i.e. the pair of semi-circular ring shaped first members and the pair of semi-circular ring shaped second members, are assembled. This makes it possible to easily install them into the nacelle where the rotor turning device is used. Still further, since the operating member of the rotor turning device is a handle-like shape, it is easy for the operator to grasp and helps facilitate rotating the rotation axis.

In the above rotor turning device, the pair of the first members is preferably provided with a notch that latches with a fastening part of the coupling.

With this arrangement, the fastening part of the coupling (for example, a nut or a bolt) is locked by the notch. Thus, even if the embracing fixture of the first members to the coupling hub does not provide sufficient fixing force (friction force), it is possible to prevent spin of the rotor turning device and the rotation axis can be securely rotated.

Further, in the above rotor turning device, it is preferable that the handle formed by the pair of second members has a plurality of teeth formed on its periphery that meshes with a chain, and the rotor turning device further includes: a sprocket connected to the handle via the chain; and a motor that drives the sprocket.

Alternatively, in the above rotor turning device, the handle formed by the pair of second members has a belt mounted on its periphery, and the rotor turning device further includes: a pulley connected to the handle via the belt; and a motor that drives the pulley.

For example, when assembling or disassembling the blades, it becomes necessary to rotate the rotation axis while some of the blades have been detached. In such a state, the load put on the rotation axis is unbalanced and thus an extremely large amount of operation force is required to rotate the rotation axis. Even in this state, the rotation axis can be easily rotated by using the sprocket and the chain or the pulley and the belt as described above to transfer driving force from the motor to the handle.

In the above rotor turning device, preferably the main body is a lever having a plurality of holes in at least two places at an end portion thereof that latch to a fastening part of the coupling; the fixing member is the plurality of holes of the lever that latch to the fastening part; and the operating member is an end portion of the lever opposite the plurality of holes.

Since the plurality of holes acting as the fixing member latch to the fastening part of the coupling of the wind turbine generator, it is possible to easily secure the rotor turning device to the coupling without having to modify the existing wind turbine generator. Further, since the main body of the rotor turning device is a lever-like shape, it can be easily installed into the nacelle where the rotor turning device is used and is easy for the operator use, to thereby facilitate rotating the rotation axis.

The present invention provides a rotor turning method for rotating a rotation axis of a wind turbine generator that increases rotational speed of a rotor head with a gear box to transmit into a generator, the method comprising: embracingly fixing a pair of semi-circular ring shaped first members to a coupling hub of a coupling arranged between the gear box and the generator of the wind turbine generator; attaching a pair of semi-circular ring shaped second members to the periphery of the pair of first members; and rotating the rotation axis by operating a handle formed by the pair of second members.

With this rotor turning method, by embracingly fixing the pair of first members to the coupling of the wind turbine generator, and by attaching the second member to the pair of the first members, the rotor turning device can be easily attached to the coupling without having to modify the existing wind turbine generator.

Further, by operating the handle formed by the pair of second members, it is possible to safely and highly accurately rotate the coupling and the entire rotation axis with a relatively small operational force.

Further, the first members and the second members are designed so that a total of four divided parts, i.e. the pair of semi-circular ring shaped first members and the pair of semi-circular ring shaped second members, are assembled. This makes it possible to easily install them into the nacelle where the rotor turning device is used. Still further, since the rotor turning device is a handle-like shape, it is easy for the operator to grasp and helps to facilitate rotating the rotation axis.

With the rotor turning method, it is preferable that the handle formed by the pair of second members has a plurality of teeth formed on its periphery that meshes with a chain, a sprocket is connected to the handle via the chain; and the rotating the rotation axis is carried out by driving the sprocket with a motor to transmit operational force for rotating the rotation axis to the handle.

Alternatively, with the rotor turning method, the handle formed by the pair of second members has a belt mounted on its periphery, and a pulley connected to the handle via the belt; and the rotating the rotation axis is carried out by driving the pulley with a motor to transmit operational force for rotating the rotation axis to the handle.

By using the sprocket and the chain or the pulley and the belt as described above to transmit the driving force from the motor to the handle, it is possible to easily rotate the rotation axis even if, for example, some blades haven been detached for assembling and disassembling.

In the present invention, the fixing member is fixed to the coupling arranged between the gear box and the generator while the operating member is provided at the opposite end of the main body from the fixing member. Therefore, it is possible to safely and highly accurately rotate the coupling and the entire rotation axis with a relatively small operational force. Especially, since the coupling arranged between the gear box and the generator is an element in the drive train of the wind turbine generator that rotates with a low torque, it is possible to rotate the rotation axis with a small operational force.

Further, since the rotor turning device can be attached via the fixing member to the coupling that is normally included in the wind turbine generator, it is not necessary to carry out any modifications to an existing wind turbine generator.

BRIEF DESCRIPTION OF THE DRAWINGS

FIG. 4 (b) is a partial cross-sectional traverse view showing an example of a structure of a high-speed phase lock pin.

FIG. 7 is a side view showing the rotor turning device of FIG. 5 in an attached state.

FIG. 9 is a view showing an example of a structure of a rotor turning device that rotates the rotation axis with power from a motor.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

First, a description will be given of an example of the wind turbine generator employing the rotor turning device of the present embodiment, followed by a description of the rotor turning device of the present embodiment.

Figure 1:
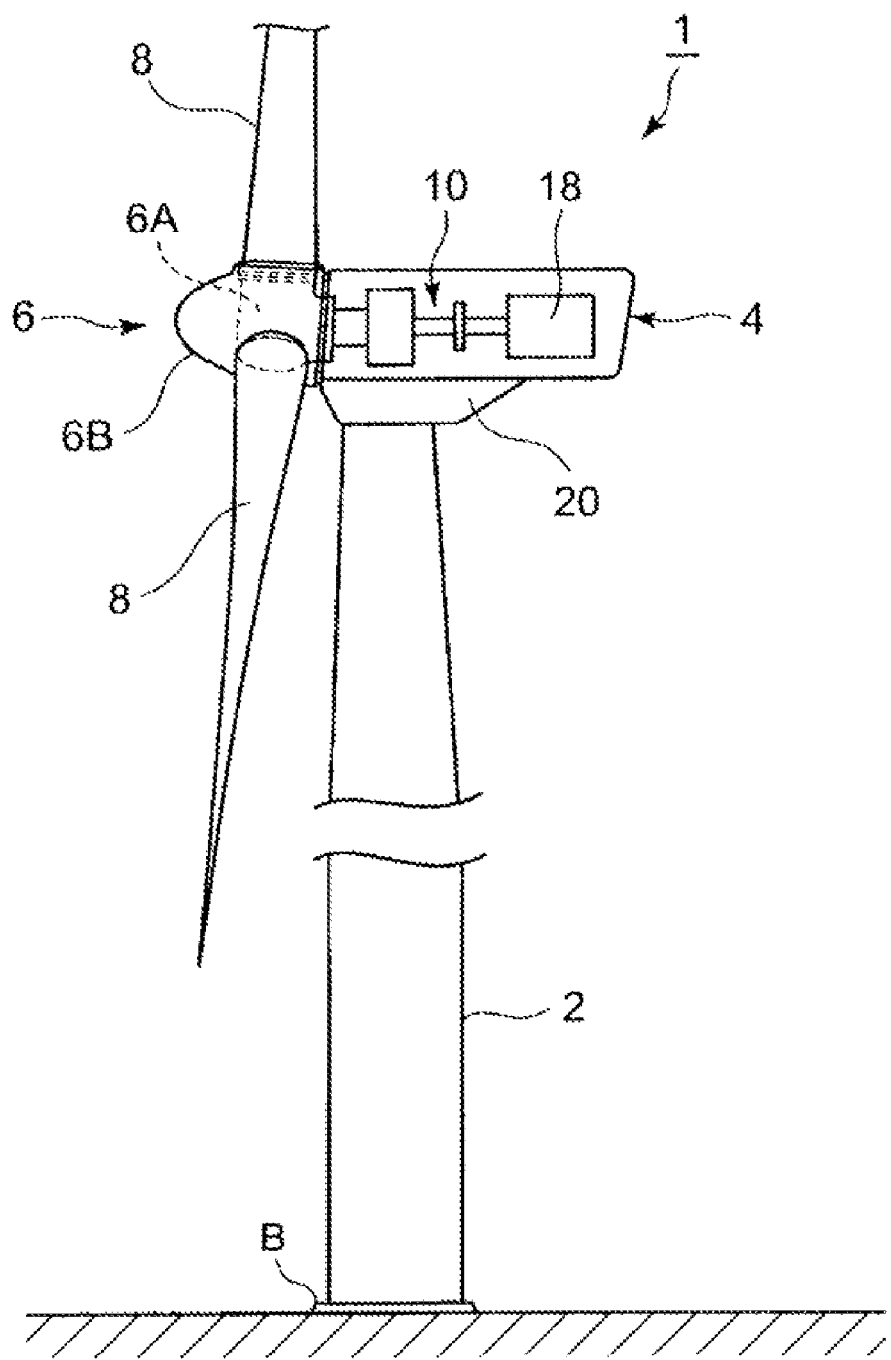
FIG. 1 is a view showing an example of the overall structure of a wind turbine generator.

FIG. 1 is a view showing an example of the overall structure of the wind turbine generator employing the rotor turning device of the present embodiment.

A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 8 attached to the rotor head 6.

As shown in FIG. 1, the tower 2 has a column-like shape extending upwardly (to the upper end of FIG. 1) from the foundation B. The tower 2, for example, can be made from a single column-like member or made from a plurality of units aligned in upright direction and coupled to each other. If the tower 2 is made from the plurality of units, the nacelle 4 is provided on the unit located on the top of the tower 2.

The nacelle 4 supports the rotor head 6 and accommodates a drive train 10 and a generator 18, etc.

Figure 2:
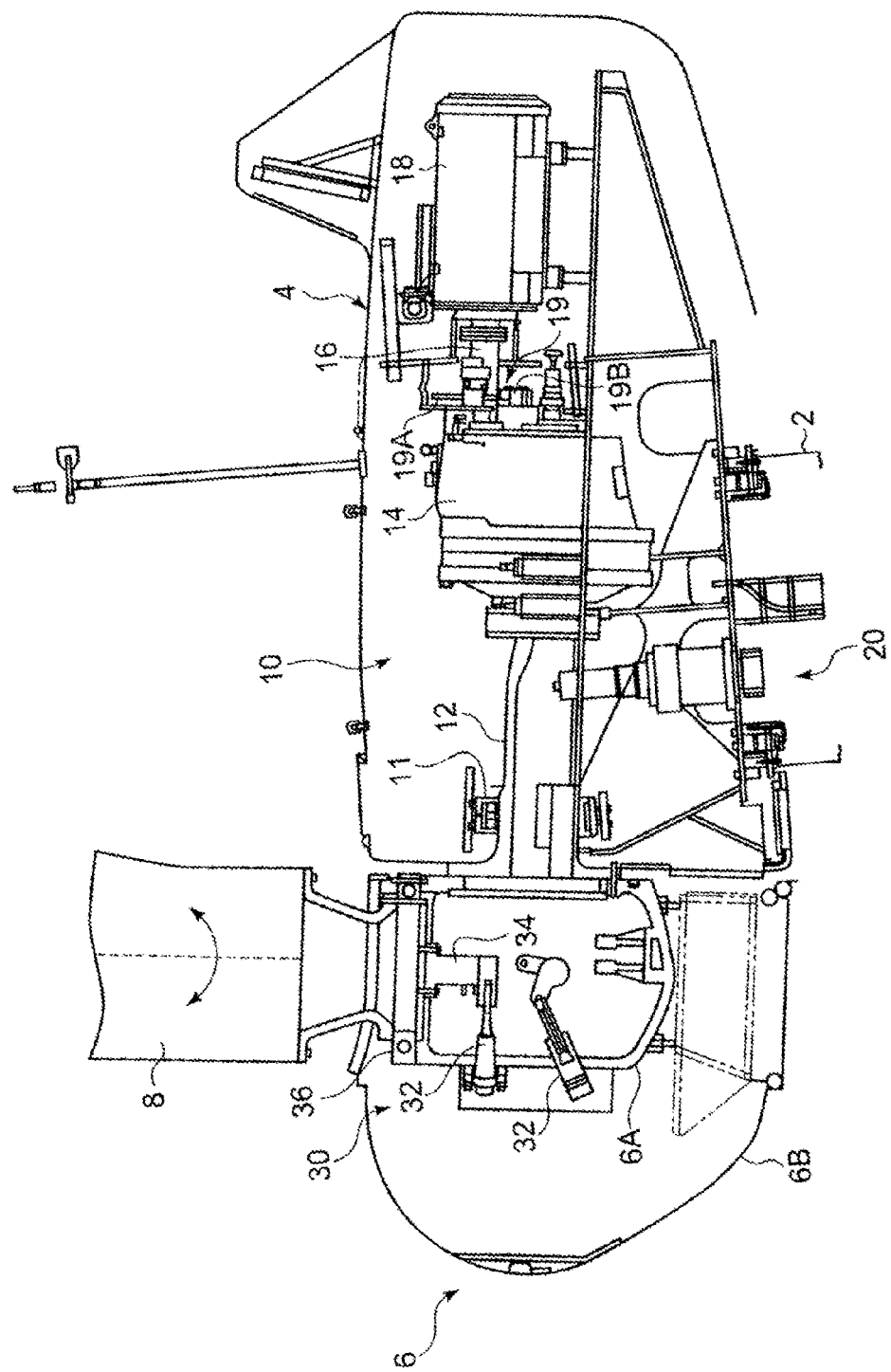
FIG. 2 is a transverse view showing a drive train and a generator provided within a nacelle.

FIG. 2 shows a detailed view of the drive train 10 and the generator 18 inside the nacelle 4. The drive train 10 includes a main shaft 12 that is connected to a rotor hub 6A of a rotor head 6, a gear box 14 connected to the main shaft 12 and a coupling 16 that couples the gear box 14 to the generator 18.

The main shaft 12 is connected to the rotor hub 6A so that it rotates with the blades 8 and the rotor head 6, and is secured to the casing side by the main shaft bearing 11 in a rotatable fashion. A grease feeding opening (not shown) is provided on the upper part of the main shaft bearing 11 to supply grease for lubrication.

The gear box 14 is arranged between the main shaft 12 and the coupling 16. The gear box 14 increases the rotational speed inputted from the main shaft 12 from the rotor head 6 side and transmits the increased rotational speed to the coupling 16. The gear box 14 may employ, for example, a combination of a planetary gear type speed increasing mechanism and a spur gear type speed increasing mechanism (neither mechanisms are shown), but is not limited to these mechanisms. This gear box 14, for example, increases a rotational speed of approximately 20 rpm inputted via the main shaft 12 from the rotor head 6 side to approximately 1800 rpm, then transmits it to the generator 18 via the coupling 16.

The coupling 16 is a shaft joint that couples a final output shaft of the gear box 14 to an input shaft of the generator 18. For example, a deflection shaft joint may be used as the coupling 16 so as to absorb misalignment between the final output shaft of the gear box 14 and the input shaft of the generator 18.

Further, the coupling 16 is provided with a brake device 19 equipped with a brake disk 19A and brake pads 19B. The brake device 19 brakes the coupling 16 by pressing and squeezing the brake pads 19B to both surfaces of the brake disk 19A. For example, the brake device 19 may be structured so that the brake pads 19B bias constantly to the brake disk 19A by a spring (not shown) and disengages from the brake disk 19A against bias force of the spring during normal operation phase by an oil pressure force.

Normally, braking the wind turbine generator 1 is mainly carried out by pitch control which will be later described, and the brake device 19 is used supplementarily. That is, when the rotation axis needs to be stopped due to strong wind or during maintenance, pitch control is first carried out to transfer the blades 8 into a feathering state. Then, after the rotational speed of the rotation axis has been sufficiently reduced, the brake device 19 is used to bring the rotation axis to a complete stop.

Further, a nacelle rotating mechanism 20 for rotating the nacelle 4 in the yaw direction is provided on a lower part of the nacelle 4.

Figure 3:
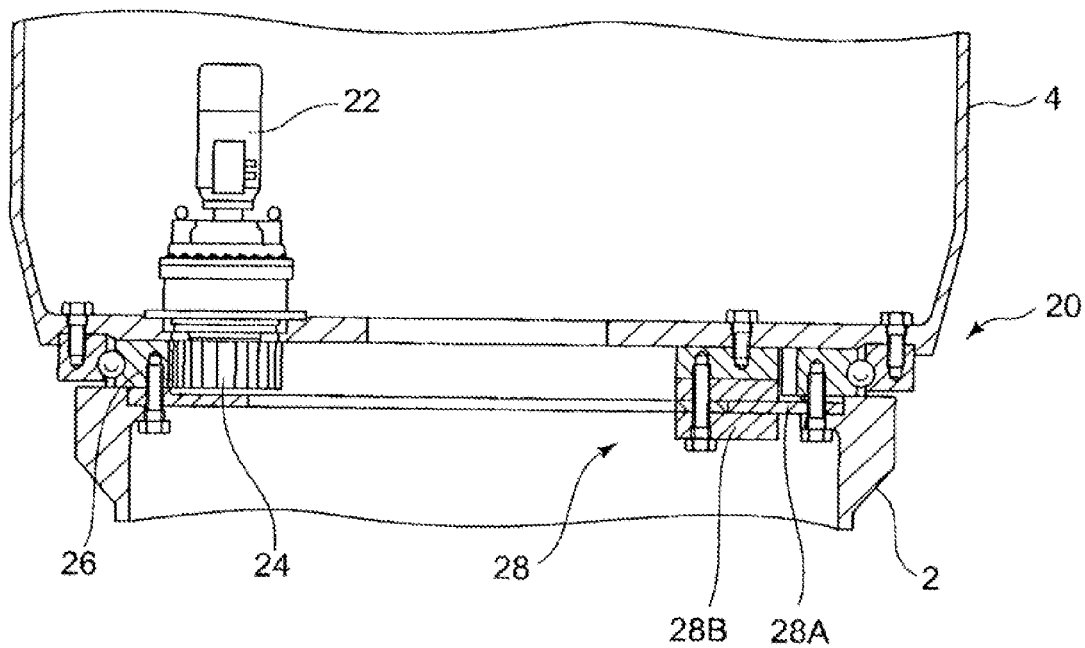
FIG. 3 is a cross-sectional view showing an example of a nacelle rotating mechanism.

FIG. 3 is a sectional view showing an example of the nacelle rotating mechanism 20. As shown in FIG. 3, the nacelle rotating mechanism 20 includes a yaw motor 22, a pinion 24 rotated by driving of the yaw motor 22, an internal gear 26 meshed with the pinion 24, and a yaw brake mechanism 28 equipped with a brake disk 28A and a brake shoe 28B. In this nacelle rotating mechanism 20, the yaw motor 22, the pinion 24 and the brake shoe 28B are held to the nacelle 4 side, while the internal gear 26 and the brake shoe 28B are held to the tower 2 side.

Thus, if the yaw motor 22 is driven, the pinion 24 is rotated so that the nacelle 4 can rotate to yaw direction. If the brake shoe 28B bites the brake disk 28A, the yaw rotation of the nacelle 4 is broken.

The rotor head 6 shown in FIGS. 1 and 2 is rotatably supported on the nacelle 4 with a rotation axis substantially extending in the horizontal direction, and includes a rotor hub 6A equipped with blades 8 and a head capsule 6B for covering this rotor hub 6A.

Further, as shown in FIG. 2, the rotor hub 6A is equipped with a pitch driving device 30 that rotates the blades 8 around the rotation axis (in a direction designated by an arrow in FIG. 2) and varies the pitch angle of the blades 8.

As shown in FIG. 2, the pitch drive device 30 includes a cylinder 32 and a rod 34 connected to the blades 8. The blades 8 are rotatably supported by a rod bearing 36 for rotating in the direction of the pitch. Due to this structure, when the rod 34 is rotated by the cylinder 32, the blades 8 rotate with the rod 34 in the pitch direction. The pitch drive devices 30 are provided in each of the blades 8 and connect together by a link mechanism that is not shown, and may be arranged so that pitch angle control of the blades 8 are interconnected.

With the wind turbine generator 1 having this structure, the rotation axis must be rotated when lubricating grease to the main shaft bearing 11, assembling or disassembling the blades 8, or carrying out various repairs and checkups.

For example, to lubricate the main shaft bearing 11 of the wind turbine generator 1, it necessary to slowly rotate the rotation axis so that grease can be applied evenly to the entire main shaft bearing 11. Further, to assemble and disassemble the blades 8, the rotor head 6 must be rotated so that the blades 8 come into a horizontal position. In addition, for safety measures during maintenance work on the wind turbine generator 1, the rotation axis should be secured with lock pins so that it does not rotate. Again in this case, the rotation axis needs to be rotated into a position where the lock pins can be inserted.

Figure 4A:
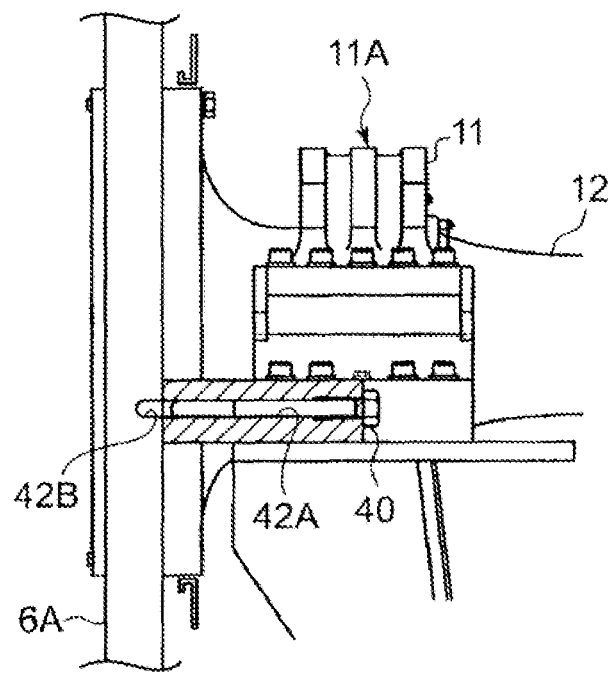
FIG. 4 (a) is a partial cross-sectional traverse view showing an example of a structure of a low-speed phase lock pin.
Figure 4B:
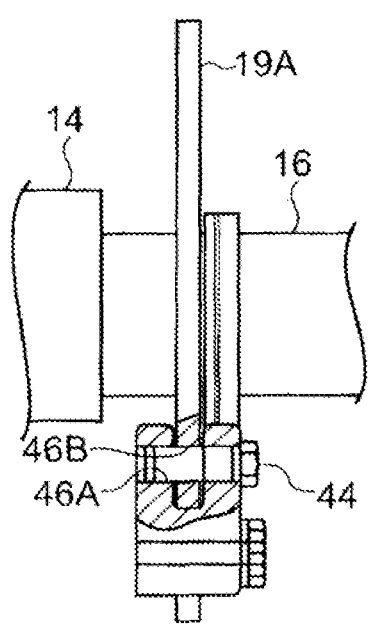

FIGS. 4(*a*) and (*b*) show examples of the structure of lock pins used to prevent the rotation axis of the wind turbine generator 1 from rotating. The wind turbine generator 1 is provided with, for example, a low-speed phase lock pin 40 in the vicinity of the main shaft bearing 11 that supports the main shaft 12 to the casing side as shown in FIG. 4(*a*), and a high-speed phase lock pin 44 in the vicinity of the brake disk 19A arranged on the later stage of the gear box 14 as shown in FIG. 4(*b*).

The low-speed phase lock pin 40 is inserted into a hole 42A formed on the casing side and a hole 42B formed on the rotor hub 6A, to thereby prevent the rotor hub 6A and the main shaft 12 connected to it from rotating. In a similar manner, the high-speed phase lock pin 44 is inserted into a hole 46A formed on the gear box casing side and a hole 46B formed on the brake disk 19A, to thereby prevent the brake disk 19A and the coupling 16 fixed to it from rotating. In order to engage these lock pins 40 and 44, the rotation axis of the wind turbine generator 1 must be rotated into a position where the holes 42A and 42B, and the holes 46A and 46B, align with each other respectively.

In this way, it becomes necessary to rotate the rotation axis during various maintenance of the wind turbine generator 1. Therefore, the rotor turning device for rotating the rotation axis of the wind turbine generator 1 is employed. The rotor turning device according to the present embodiment will now be described.

Figure 5:
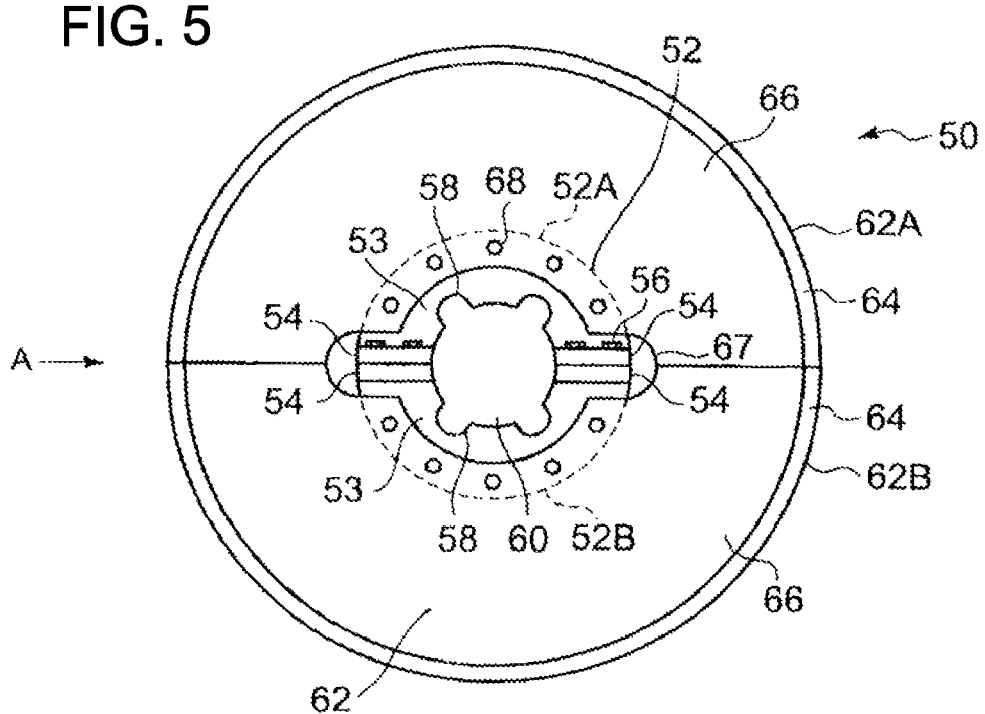
FIG. 5 is a planar view showing an example of a structure of a rotor turning device.
Figure 6:
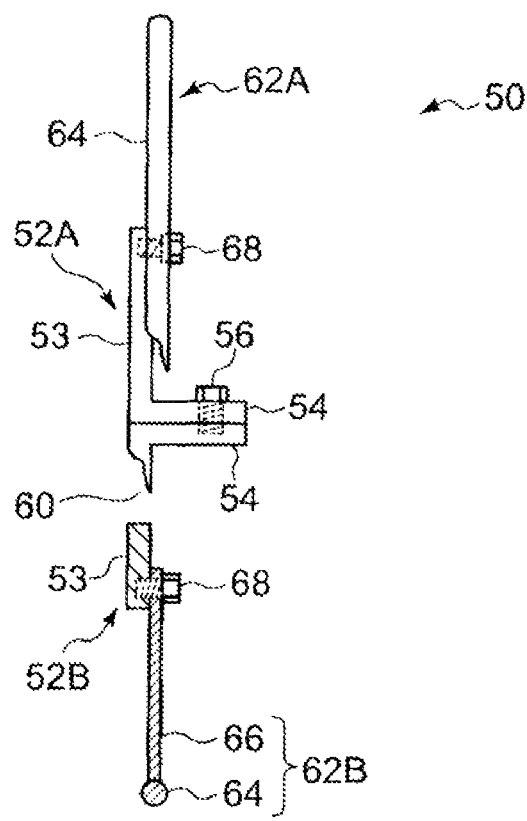
FIG. 6 is a partial cross-sectional side view of the rotor turning device in FIG. 5 viewed from the direction of A.

FIG. 5 is a planar view showing an example of the structure of the rotor turning device according to the present embodiment. FIG. 6 is a partial cross-sectional side view of the rotor turning device in FIG. 5 viewed from the direction of A.

As shown in FIGS. 5 and 6, the rotor turning device 50 comprises a pair of semi-circular ring shaped first members 52 (52A and 52B) and a pair of semi-circular ring shaped second members 62 (62A and 62B) attached to the periphery of the pair of first members 52.

Each first member 52A and 52B of the pair of first members 52 comprises a semi-circular disk 53 provided with connecting parts 54 at both ends thereof. The pair of first members 52 (52A and 52B) are fastened together by a bolt 56 so that their connecting parts 54 face and interlock with each other, and forms a through hole 60. This through hole 60 has a radius size corresponding to the hub of the coupling 16 that is to be embracingly fixed by the pair of first members 52 (52A and 52B). The first members 52 (52A and 52B) can be provided with a notch 58 that latches to the fastening part of the coupling 16.

Each second member 62A and 62B of the pair of second members 62 comprises a semi-circular disk 66 provided with a pipe 64 on the periphery thereof so that an operator can easily grasp and apply force to it. The semi-circular disk 66 and the pipe 64 can be formed integrally or can be secured together by bonding, welding or by other preferred methods. The semi-circular disk 66 can be provided with a notch 67 so as to prevent interference with the connecting parts 54 of the first members 52. The pair of second members 62 (62A and 62B) are fixed to the pair of first members 52 (52A and 52B) by a bolt 68.

Aluminum, for example, can be used as a material for the pair of first members 52 (52A and 52B) and the pair of second members 62 (62A and 62B). Since aluminum is a light weight metal, it makes it easy to install the rotor turning device 5 into the nacelle 4.

Figure 8A:
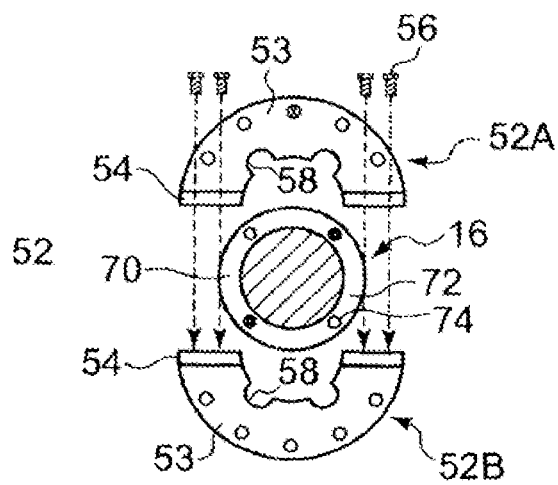
FIG. 8 is a view showing the steps for attaching the rotor turning device of FIG. 5.
Figure 8B:
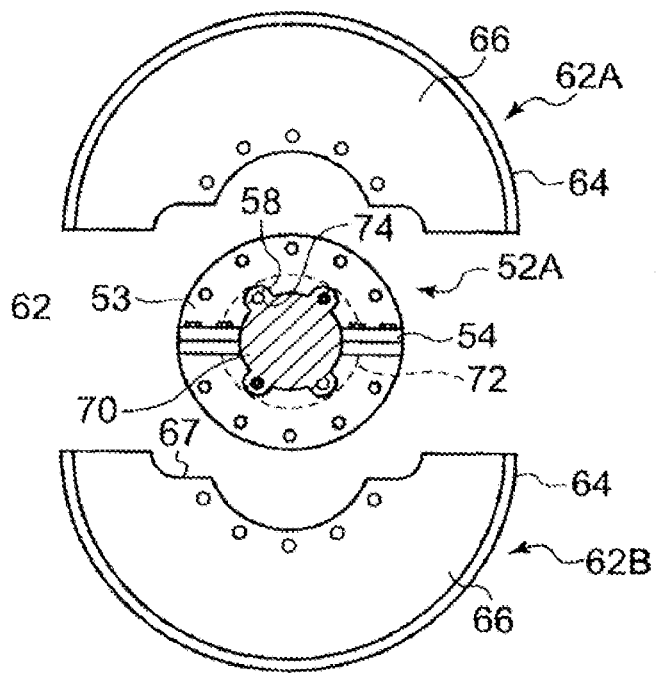
Figure 8C:
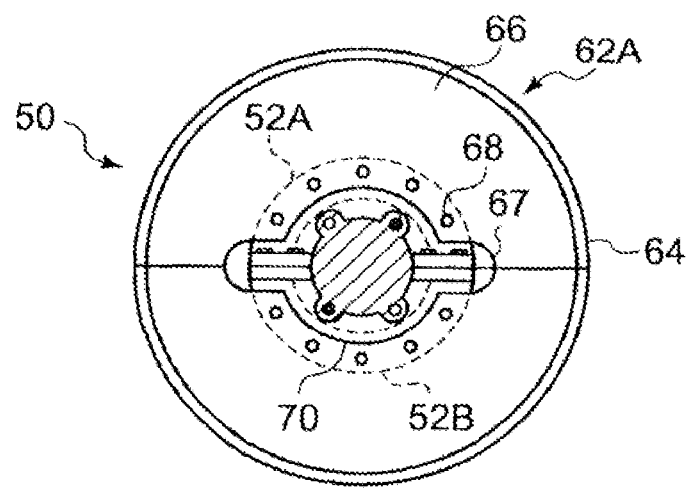

FIG. 7 is a view showing the rotor turning device 50 in an attached state. FIG. 8 is a view showing the steps for attaching the rotor turning device 50.

As shown in FIG. 7, the above-described rotor turning device 50 is attached to the coupling 16 arranged between the gear box 14 and the generator 18, by embracingly fixing the first members 52 (52A and 52B) to the coupling hub 70 of the coupling 16. FIG. 7 shows an example where the rotor turning device 50 is attached to the coupling hub 70 on the generator 18 side of the coupling 16. However, as long as the rotor turning device 50 is attached to a hub of the coupling 16, the position where the rotor turning device 50 is attached (the embracingly fixing position of the first members 52) need not be specified.

Steps for attaching the rotor turning device 50 to the coupling 16 will now be described with reference to FIG. 8 (*a*)-(*c*).

First, as shown in FIG. 8 (*a*), the connecting parts 54 of the pair of first members 52 (52A and 52B) are screwed by the bolts 56 so that the first member 52A and the first member 52B embracingly fix to the coupling hub 70. Here, when the first members 52 (52A and 52B) are pressed to the coupling hub 70, a gap forms between the connecting parts 54 that face each other. The size of the gap determines the fixing force (friction force) of the first members 52 (52A and 52B) embracingly fixing the coupling hub 70.

Further, if a notch 58 is provided in the first members 52 (52A and 52B), the first members 52 (52A and 52B) are embracingly fixed by a bolt 56 while pressed to an end surface of a coupling flange 72 of the coupling 16, so that a head a coupling bolt (fastening part) 74 of the coupling 16 latches with the notch 58. By this arrangement, the coupling bolt 74 of the coupling 16 is locked to the notch 58 of the first members 52 (52A and 52B). Therefore, even if the embracing fixture of the first members 52 (52A and 52B) to the coupling hub 70 does not provide sufficient fixing force (friction force), it is possible to prevent spin of the rotor turning device 50 and securely rotate the coupling hub 70.

Next, as shown in FIGS. 8(*b*) and (*c*), the second members 62 (62A and 62B) are attached by a bolt 68 to the first members 52 (52A and 52B) that embracingly fixes to the coupling hub 70. If a notch 67 is provided in the semi-circular disk 66 of the second members 62 (62A and 62B), the second members 62 are attached so that the connecting parts 54 of the first members 52 are inside the notch 67. This arrangement prevents the second members 62 from interfering with the connecting parts 54.

In this way, since the pair of first members 52 (52A and 52B) embracingly fixes to the coupling hub 70 of the wind turbine generator 1, the rotor turning device 50 can be easily attached to the coupling 16 without having to modify the existing wind turbine generator 1. Further, since the first members 52 and the second members 62 are designed so that a total of four divided parts, i.e. the pair of first members 52

(52A and 52B) and the pair second members 62 (62A and 62B), are assembled, it makes it possible to easily install them into the nacelle where the rotor turning device 50 is used. Still further, when the pair of second members 62 (62A and 62B) are assembled, it forms a handle-like shape which is easy for the operator to grasp. Thus, rotating the rotation axis of the wind turbine generator 1 is facilitated. Especially, if the pipe 64 is provided on the periphery of the second members 62 (62A and 62B), it makes it easy for the operator to apply force and thus facilitates the operation.

Rotating the rotation axis with the rotor turning device 50 can be done manually by the operator or can be done using motion from a motor.

FIG. 9 is a view showing an example of the structure of the rotor turning device 50 that rotates the rotation axis by a motion from a motor. The first members 52 (52A and 52B) and the second members 62 (62A and 62B) of the rotor turning device 50 are attached to the coupling hub 70. Further, the second members 62 have a plurality of teeth formed on its periphery which meshes with a chain 80, and a sprocket 82 is connected to the second members 62 via the chain 80. The sprocket 82 is driven by a motor with speed reducer 84 that activates based on signals from an operation panel 86. Power is supplied to the motor with speed reducer 84 from a temporary power supply 88 via the operation panel 86.

It is preferable that the sprocket 82 has a diameter smaller than that of the handle formed by the pair of second members 62 (62A and 62B). With this structure, the rotational speed of the sprocket 82 can be sufficiently reduced to transmit to the handle, making it possible to precisely rotate the rotation axis into a predetermined position.

A mount 85 having a tension adjusting function of the chain 80 is provided on a lower part of the motor 84. It is preferable that the mount 85 is attached to the wind turbine generator 1 by utilizing a centering jig attachment hole included in a nacelle bed of the nacelle 4. The centering jig attachment hole is a hole used to secure the centering jig used for aligning the final output shaft of the gear box 14 and the input shaft of the generator 18 to the nacelle bed of the nacelle 4. The centering jig is bolted to the centering jig attachment hole and is used to finely adjust the main body of the generator in all directions.

When assembling and disassembling the blades 8, it becomes necessary to rotate the rotation axis of the wind turbine generator 1 while some of the blades 8 have been detached. In such a state, the load put on the rotation axis is unbalanced and thus an extremely large amount of operation force is required to rotate the rotation axis. As shown in FIG. 9, by using the sprocket 82 and the chain 80 to transmit the driving force from the motor with speed reducer 84 to the second members 62 (62A and 62B), it is possible to easily rotate the rotation axis even in such a state.

Although an example using the sprocket 82 and the chain 80 was described in FIG. 9, a pulley and a belt may alternatively be used to transmit the driving force from the motor with speed reducer 84 to the second members 62 (62A and 62B). In this case, the belt can be mounted on the periphery of the second members 62 (62A and 62B) and the pulley can be connected to the second members 62 (62A and 62B) via the belt for driving the motor with speed reducer 84 with the pulley.

As described above, according to the present embodiment, the rotor turning device 50 is provided on the inner periphery with the first members 52 (52A and 52B) acting as the fixing member for fixing to the coupling hub 70, and is provided on the outer periphery with the second members 62 (62A and 62B) acting as the operating member to which operational force for rotating the rotation axis of the wind turbine generator 1 is inputted.

According to the rotor turning device 50, the first members 52 are fixed to the coupling 16 arranged between the gear box 14 and the generator 18, and an operational force is inputted to the second members 62 that are provided on the periphery of the first members 52. This makes it possible to safely and highly accurately rotate the coupling 16 and the entire rotation axis with a relatively small operational force. Especially, since the coupling 16 arranged between the gear box 14 and the generator 18 is an element in the drive train 10 of the wind turbine generator 1 which rotates with a low torque (in other words, is an element with high rotational speed), it is possible to rotate the rotation axis with a small operational force. Further, since the rotor turning device 50 is configured so that it is attachable via the first members 52 to the coupling 16 which is an element that is normally included in the wind turbine generator 1, there is no need to make any modifications to the existing wind turbine generator 1.

Further, in the rotor turning device 50 of the present embodiment, the pair of first members 52 (52A and 52B) embracingly fixes to the coupling hub 70 of the coupling 16, and the pair of second members 62 (62A and 62B) attached to the first members 52 form a handle-like shape.

In this manner, by embracingly fixing the pair of first members 52 (52A and 52B) to the coupling hub 70 of the wind turbine generator 1, the rotor turning device 50 can be easily attached to the coupling 16 without having to modify the existing wind turbine generator 1. Further, the first member 52 and the second member 62 are designed so that a total of four divided parts, i.e. the pair of semi-circular ring shaped first members 52 (52A and 52B) and the pair of semi-circular ring shaped second members 62 (62A and 62B), are assembled. This makes it possible to easily install them into the nacelle 4 where the rotor turning device 50 is used. Still further, since the operating member (the second members 62) of the rotor turning device 50 is handle-like shaped, it is easy for the operator to grasp and helps facilitate rotating the rotation axis.

While the present invention has been described with reference to exemplary embodiments, it is to be understood that the invention is not limited to the disclosed exemplary embodiments and that modifications and variations are possible within the scope of the appended claims For example, in the embodiment described above, the first members 52 and the second members 62 comprising the rotor turning device 50 each had a dual-partitioning structure (i.e. having a pair of semi-circular rings). However the structure of the first members 52 and the second members 62 is not limited to this and can be arranged so that the first members 52 and the second members 62 are each divided into three or more parts. In this case, if the three or more parts of the first members 52 and the second members 62 are connected by a hinge, the assembly of these parts will be simplified.

Further, the second member 62 may be configured so that a generally circular member having a notch for preventing interference with the coupling 16 is combined with a member to fill that notch. In this case, the filling member is attached to the first members 52 after the generally circular member is attached to the first members 52, so that rotor turning device 50 becomes a handle-like shape without any notches.

In the embodiment described above, the rotor turning device 50 is configured so that the first members 52 and the second members 62 are combined to form a handle-like shape. However, the configuration of the rotor turning device 50 is not limited to this example, and may be configured as described below.

Figure 10:
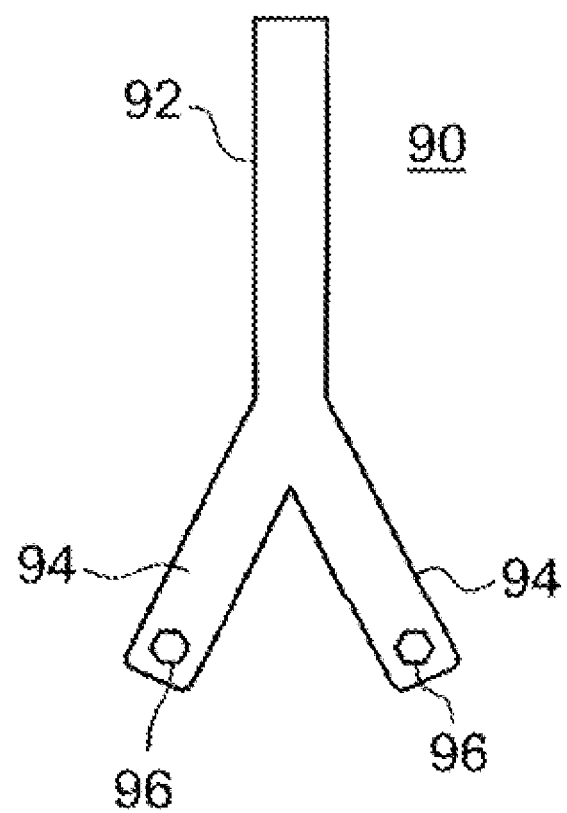
FIG. 10 is a planar view showing an example of a structure of a variation example of the rotor turning device.

FIG. 10 is a planar view showing another example of a structure the rotor turning device. FIG. 11 is a diagram showing how the rotation axis is rotated using the rotor turning device.

As shown in FIG. 10, a rotor turning device 90 is comprised of a lever 92 having a pair of branching portions 94 provided on an end portion thereof. Each of the branching portions 94 has a hole 96 provided thereon. The number of holes 96 for the rotor turning device 90 is not limited, as long as it is more than two.

Figure 11A:
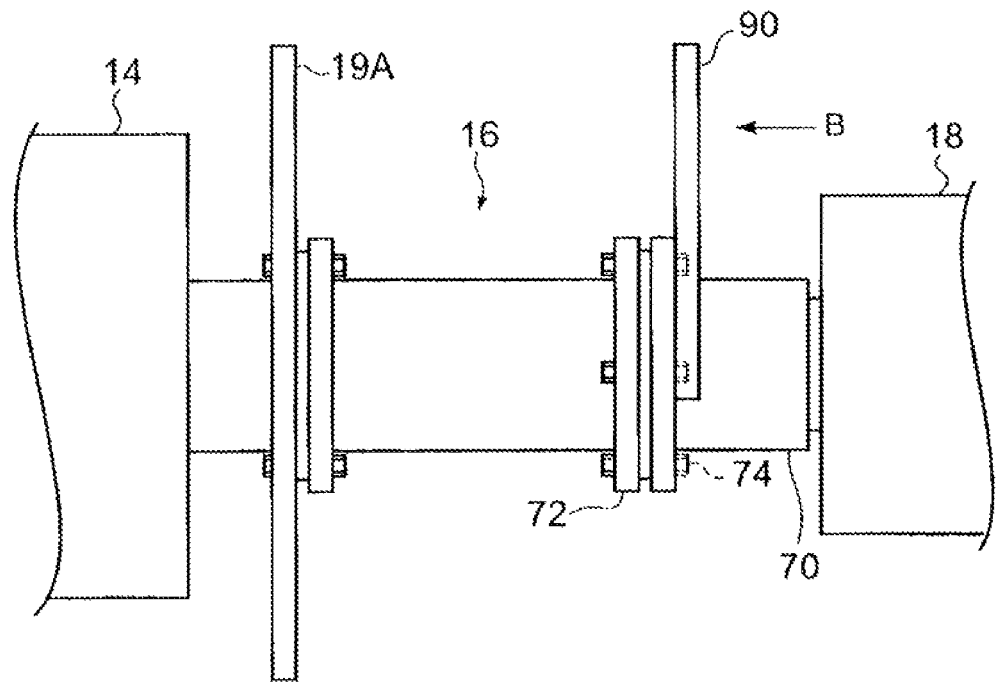
FIG. 11(a) is a side view showing the rotor turning device of FIG. 10 in an attached state.
Figure 11B:
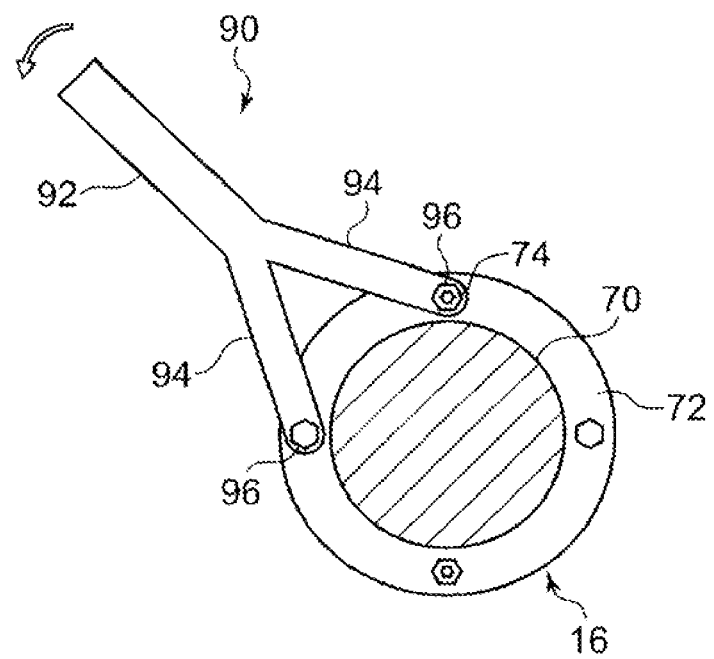
FIG. 11(b) is a view of the rotor turning device in FIG. 11(a) viewed from the direction of B.

As shown in FIGS. 11(a) and (b), the rotor turning device 90 is attached to the coupling 16 arranged between the gear box 14 and the generator 18. Specifically, the rotor turning device 90 is attached to the coupling 16 by latching the holes 96 of the rotor turning device 90 to the coupling bolt (fastening part) 74. As shown in FIG. 11(b), the coupling 16 is rotated by moving the lever 92 in the direction of the arrow. In the example shown in FIG. 11(a), the rotor turning device 90 is attached to the end surface of the coupling flange 74 on the generator 18 side, however the position for attaching the rotor turning device 90 is not limited to this.

With the rotor turning device 90, the lever 92 is provided with the plurality of holes 96 at one end thereof acting as the fixing member for fixing to the coupling 16, while on the other end of the lever 92, the operating member is provided for inputting operational force to rotate the rotation axis of the wind turbine generator 1.

With this arrangement, the plurality of holes 96 acts as the fixing member and latches to the fastening portion 74 of the coupling 16 of the wind turbine generator 1. Therefore, the rotor turning device 90 can be easily attached to the coupling 16 without having to modify the existing wind turbine generator 1. Further, since the rotor turning device 90 is a lever-like shape, it is easy to install into the nacelle 4 where it is used, and is easy for the operator to use, to thereby facilitate rotating the rotation axis.

In the examples shown in FIGS. 10 and 11, the holes 96 were provided in the branching portions 94. However, notches that latch to the fastening part 74 of the coupling 16 can be provided in lieu of the holes 96.

The invention claimed is:

1. A rotor turning device for rotating a rotation shaft of a wind turbine generator that increases rotational speed of a rotor head with a gear box to transmit a rotation into a generator, comprising:
   a main body;
   a fixing member provided on an inner side of the main body that fixes to a coupling arranged between the gear box and the generator of the wind turbine generator; and
   an operating member provided on an outer side of the main body from the fixing member, to which operational force for rotating the rotation shaft is inputted,
   wherein the main body includes a pair of semi-circular ring shaped first members that embracingly fixes to a coupling hub of the coupling and a pair of semi-circular ring shaped second members that attaches to a periphery of the pair of first members, and
   wherein the fixing member is the pair of first members embracingly fixed to the coupling hub, and the operating member is a handle formed by the pair of second members.

2. A rotor turning device for a wind turbine generator according to claim 1, wherein the pair of first members is provided with a notch that latches with a fastening part of the coupling.

3. A rotor turning device for a wind turbine generator according to claim 1, wherein the handle formed by the pair of second members has a plurality of teeth formed on a periphery of the handle that meshes with a chain, and the rotor turning device further includes:
   a sprocket connected to the handle via the chain, and
   a motor that drives the sprocket.

4. A rotor turning device for a wind turbine generator according to claim 1, wherein the handle formed by the pair of second members has a belt mounted on a periphery of the handle, and the rotor turning device further includes:
   a pulley connected to the handle via the belt; and
   a motor that drives the pulley.

5. A rotor turning device for rotating a rotation shaft of a wind turbine generator that increases rotational speed of a rotor head with a gear box to transmit a rotation into a generator, comprising:
   a main body;
   a fixing member provided on an inner side of the main body that fixes to a coupling arranged between the gear box and the generator of the wind turbine generator; and
   an operating member provided on an outer side of the main body from the fixing member, to which operational force for rotating the rotation shaft is inputted,
   wherein the main body is a lever having a plurality of holes in an end portion thereof that latch to a fastening part of the coupling;
   the fixing member is the plurality of holes of the lever that latch to the fastening part; and
   the operating member is an end portion of the lever opposite the plurality of holes.

6. A rotor turning method for rotating a rotation shaft of a wind turbine generator that increases rotational speed of a rotor head with a gear box to transmit into a generator, the method comprising:
   embracingly fixing a pair of semi-circular ring shaped first members to a coupling hub of a coupling arranged between the gear box and the generator of the wind turbine generator;
   attaching a pair of semi-circular ring shaped second members to a periphery of the pair of first members; and
   rotating the rotation shaft by operating a handle formed by the pair of second members.

7. A rotor turning method for a wind turbine generator according to claim 6 wherein:
   the handle formed by the pair of second members has a plurality of teeth formed on a periphery of the handle that meshes with a chain;
   a sprocket is connected to the handle via the chain; and
   the rotating the rotation shaft is carried out by driving the sprocket with a motor to transmit operational force for rotating the rotation shaft to the handle.

8. A rotor turning method for a wind turbine generator according to claim 6 wherein:
   the handle formed by the pair of second members has a belt mounted on a periphery of the handle;
   a pulley is connected to the handle via the belt; and
   the rotating the rotation shaft is carried out by driving the pulley with a motor to transmit operational force for rotating the rotation shaft to the handle.

* * * * *